Figure 1:
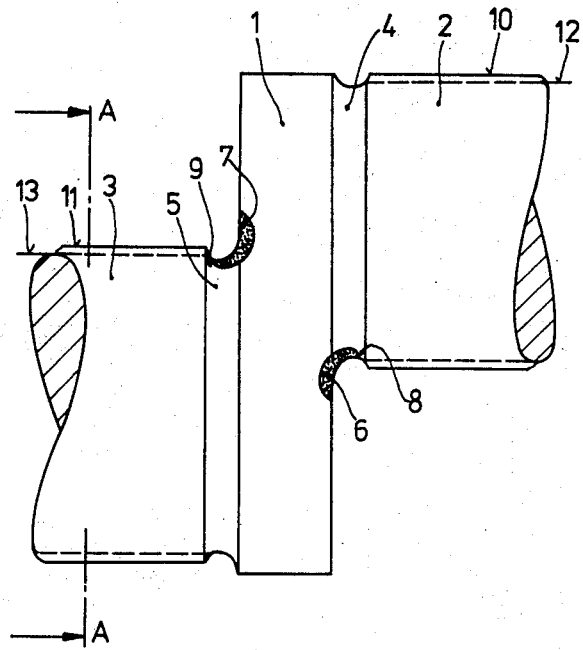

United States Patent [19]
Sommer

[11] 3,824,659
[45] July 23, 1974

[54] CRANKSHAFT WITH HARDENED TRANSITION PORTIONS AND ITS MANUFACTURE

[75] Inventor: Richard Sommer, Augsburg, Germany

[73] Assignee: Maschinenfabrik Augsburg-Nurnberg Aktiengesellschaft, Augsburg, Germany

[22] Filed: Mar. 5, 1973

[21] Appl. No.: 338,131

[52] U.S. Cl. ............................. 29/149.5 R, 74/705
[51] Int. Cl. ........................................... B21d 53/10
[58] Field of Search.......... 29/149.5 R, 6, 149.5 DP; 74/605

[56] References Cited
UNITED STATES PATENTS

| | | |
|---|---|---|
| 3,313,016 | 4/1967 | Seulen et al. ................. 29/149.5 R |
| 3,510,928 | 5/1970 | Seulen et al. ................. 29/149.5 R |
| 3,621,733 | 11/1971 | Seulen et al. ......................... 74/705 |

Primary Examiner—Thomas H. Eager
Attorney, Agent, or Firm—Flynn & Frishauf

[57] ABSTRACT

The crankshaft blank is first machined to provide oversize bearing pin thickness. Relief grooves provide transition fillets. Heat hardening is provided in a portion of these fillets, mainly in the portion of their periphery that falls within the longitudinal overlap of adjacent bearing pins. The bearing pins are then machined to design dimensions, parallelism and alignment, at the same time eliminating the effect of any warp arising from the hardening process.

9 Claims, 2 Drawing Figures

PATENTED JUL 23 1974 3,824,659

CRANKSHAFT WITH HARDENED TRANSITION PORTIONS AND ITS MANUFACTURE

The invention relates to a method of manufacturing a crankshaft for a piston engine, particularly a large Diesel motor, and crankshafts so made. More particularly, the invention relates to crankshafts with hardened transitions between the bearing pins and the crankwebs and their manufacture.

The hardening of the transition regions between the bearing pins and the crankwebs of a crankshaft makes it possible to raise considerably the load capacity of this machine component. In the hardening process, however, the material is heated to a temperature region in which the mechanical solidity is so far reduced that latent internal stresses present in the material can be released which will then be relieved by spontaneous deformation in the material. By this so called hardening warp, a certain eccentricity of the crankshaft is produced which requires correction. It is known to make possible the after-correction of a crankshaft with hardened transitions between the bearing pins and the crank webs. As disclosed in German Auslegeschrift No. 1,022,427, not all of the transitions adjoining the bearing pins are hardened, but only some of them. It is thereby intended that the deformation necessary to correct the shape of the crankshaft can be taken up by the unhardened transitions, while the hardened transitions are spared any further deformation. The corrective alignment of such crankshafts involves the danger, however, that the hardening warp cannot be completely compensated by deformation of the unhardened cross sections. The correcting operation is highly susceptible to error, moreover, because it requires a great deal of precision handling capability and experience on the part of the operating personnel. Errors in this operation may produce cracks in the hardened transitions. This realignment, moreover, is most time consuming. Furthermore, the result is that the maximum permissible loading for the hardened transitions is different from that for the unhardened transitions.

It is therefore an object of the present invention to provide a basically simple method for the production of a crankshaft in which eccentricity and alignment errors of a hardened crankshaft can be completely eliminated at all of the transitions between the bearing pins and the crank webs.

Subject matter of the present invention

Briefly, a crankshaft is made by first fabricating a crankshaft blank in which oversize bearing pin blanks are joined by crank webs which are of finished dimensions, then machining the transition regions between bearing pins and crank webs to final contour, then hardening at least a peripheral segment of each transition region and finally turning down the bearing pins to obtain at the same time the design dimensions of the bearing pins, with parallelism of relatively offset bearing pins and accurate alignment of those bearing pins that are disposed in line. Machine finishing of the bearing pins may thereafter be carried out if necessary or desirable. The transition regions are preferably shaped as rounded grooves one side of which, the bearing pin side, is reduced in extent by the subsequent step of machining the bearing pins after the hardening step. The hardening is preferably accomplished with induction heating, which permits the hardening to be localized on a portion of the periphery of the transition regions including particularly the portion included in the longitudinal overlap of adjacent bearing pins.

Although the hardening extends to and preferably into the body of the adjacent crank webs, it reaches somewhat short of the opposite boundary of the transition region in order to assure that there will be no interference with the subsequent machining of the running surface of the adjacent bearing pin.

Figure 2:
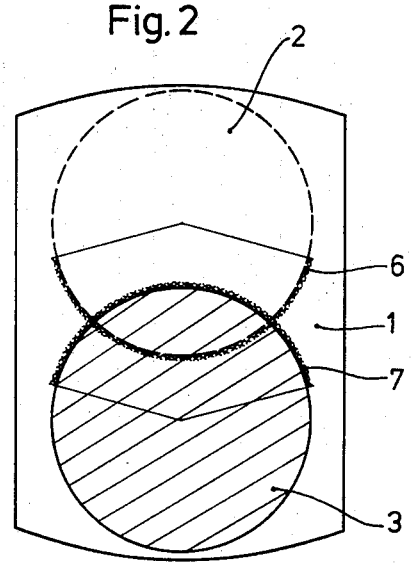

The invention will be described by way of example with reference to the accompanying drawing, wherein:

FIG. 1 shows a crank web and portions of two bearing pins forming part of a crankshaft made in accordance with the invention, and FIG. 2 is a cross section along the line A—A of FIG. 1.

The crankweb 1 connects a first bearing pin 2, which may for example be a main bearing pin, with a second bearing pin 3 arranged parallel and offset with respect to the bearing pin 2. The bearing pin 3 may accordingly be a crank pin of the crankshaft of which a portion is shown in FIG. 1. The main bearing pins serve to hold a crankshaft in the fixed main crankshaft bearings of the engine, whereas the crank pins engage the connecting rod bearings. A relief groove is provided at the transition 4 between the bearing pin 2 and the crankweb 1. Likewise, the transition 5 between the bearing pin 3 and the crank web 1 is formed by a relief groove. Other forms of transition are also possible, for example one produced by end-relief machining.

The relief grooves shown, which are readily produced by a lathe operation, are effective to reduce appreciably the considerable stress concentrations that arise at the transitions 4 and 5. These transitions between the bearing pins and the crankwebs, however, still remain critical sections of the crankshaft. In order to increase the safety margin against breaking, the transition 4 between the bearing pin 2 and the crankweb 1 is therefore provided with a hardened zone 6 which corresponds in its cross section approximately to the spread of stresses in this region. In a similar way, a hardened zone 7 is provided for the transition 5. The hardened zones 6 and 7 extend, with reference to the axial direction, more or less in the region of the smallest diameter of the transitions 4 and 5, but unsymmetrically so that gaps 8 and 9 are present made up of unhardened regions. The intervals 8 and 9 can however be very small, it being merely a matter of assuring that hardened material will not be touched in subsequent turning down of the bearing pins. The hardened zones 6 and 7 can run around the entire periphery of the transitions 4 and 5 or merely, as shown in FIG. 2, extend over the region in which the bearing pins 2 and 3 overlap. It has been found particularly advantageous to dispose the hardened zones 6 and 7 symmetrically with regard to the line connecting the axes of the two bearing pins 2 and 3, so that they extend over an arc going somewhat beyond the overlap region, thus in the illustrated example about 150°.

As starting material for a crankshaft to be manufactured in accordance with this invention a hammer forged blank may be used, for example. The use of a costly wrought iron or other fibrous forging can be avoided by the use of the manufacturing method of this invention. The first lathe operation involves turning down the bearing pins 2 and 3 to the thickness shown at 10 and 11 in FIG. 1 and the setting off of the surfaces so formed from the crank web 1 by relief grooves. Large tolerances can be allowed for the machining of the grooves, since the load capacity of a portion of each transition will be so greatly increased by the subsequent hardening that the influence of differences in shape fades into the background. The transitions 4 and 5 are inductively heated to produce the hardened zones 6 and 7. Inductive heating offers the advantage that the hardening can be carried out in a locally limited fashion. The warping arising from hardening is fully eliminated during the subsequent turning down of the bearing pins 2 and 3 to the design thickness indicated at 12 and 13 respectively in FIG. 1. In this machining operation, moreover, the surfaces of all the bearing pins can be made exactly parallel and the surfaces of those that are disposed in a line can be machined into exact alignment.

If the oversize original dimension of the bearing pins is chosen near the practical lower limit, which is to say in a range which corresponds rather closely to the warping of the crankshaft as the result of hardening, the objective may be attained that on the one hand the eccentricity error of the crankshaft can be fully eliminated and on the other hand unnecessary waste of time and material can be avoided. The possibility here provided of having the last fabrication operation consist of a machine tool shaping of a soft (free machining) material, for example the turning down of the bearing pins in a fine machining operation, leads to very favorable production time values even in the case in which a relatively heavy warp is to be eliminated. After the bearing pins have been turned down, still further machining can be carried out, for example grinding or superfinishing.

The provision in all the transitions between bearing pins and crankwebs of hardened zones which are adjacent to relatively soft bearing pins on the one hand allows the life extending effect of the hardened transitions to be provided without any circumstantial limitation of the carrying capacity and on the other hand imposes no limitations on the possibility of a simple machining of the article to finished shape. The considerable improvement of quality of the crankshaft produced by the hardening of the transition regions overshadows the influence on quality of the basic material as well as that of the accuracy of machining, so that the possibility is created of choosing a less expensive metal as starting material and of allowing relatively large tolerances for the machining of the transitions. In this manner a very substantial cheapening of the final product and a shortening of the production time may be obtained.

It is because of the fact that in the preliminary machining a considerable excess is left on the bearing pins for machining tolerance, which is machined down only after the hardening of the transition, that the warping caused by the hardening can be completely eliminated by a simple material removing machining operation. On account of the unhardened state of the bearing pin material, a relatively thick layer can be taken off at each pass. The provision of such machining as the last step of the operation, moreover, offers the opportunity to provide precise supervision and control with simple measuring instruments. The production of parallel surfaces on all bearing pins and precisely aligned surfaces on those disposed in a straight line is thus readily accomplished in the manufacturing procedure according to the invention by a simple and inexpensive material removing machining of the relatively soft bearing pins and renders superfluous any further noncutting shaping that would fatigue the material.

It is particularly convenient to include fine machining of the bearing pins to their finished dimensions in the manufacture of the crankshaft according to the invention. Lathe machining provides operations that are unusually simple to carry out with which high orders of precision may be obtained. Time consuming grinding operations on the bearing pins, which must be carried out if the bearing pins are hardened, can thus be entirely dispensed with in manufacture according to the present invention.

As already noted, it is particularly advantageous in the manufacture of crankshafts according to the present invention to shape the transitions between the bearing pins and the crank webs in the form of relief grooves. In this manner it is easy to offset the running surfaces of the bearing pins, which are not to be hardened, from the hardened zones. It is thus assured that the portions of the crankshaft that are intended for material removing machining after the hardening process will remain entirely free of hardening phenomena.

As above noted, in the manufacture of a crankshaft in accordance with the invention the hardened portions of the transition regions may lie principally in the overlap region of two bearing pins connecting to the same crank web. This has the advantage that the load capacity is increased where the greatest loading takes place. This feature thus has the further advantage that the heat applied on one side of a crankweb to harden a concave fillet formed by one relief groove is conducted away to the bearing pin lying on the other side of the crank web, so that locally limited thermal overloading is thereby prevented.

Although the invention has been described with reference to a particular embodiment, it will be understood that variations and modifications are possible within the inventive concept without departing from the spirit of the invention.

I claim:

1. The method of making a crankshaft for a reciprocating piston machine comprising:
   fabricating a crankshaft blank comprising oversize blanks of bearing pins (2,3) joined by crank webs (1) of finished dimensions;
   machining the transition regions (4,5) between each bearing pin and adjacent crank web to final contour;
   hardening at least a peripheral segment of each of said transition regions, and
   thereafter performing the final machining of the bearing pins to design dimensions and parallelism, including alignment of bearing pins disposed in line.

2. A method as defined in claim 1 in which the thickness allowance for machining said bearing pins after said hardening step is of a magnitude at least corresponding to the extent of warp from hardening.

3. A method as defined in claim 1 in which said final machining of the bearing pins includes machine finishing to finished dimensions.

4. A method as defined in claim 1 in which unhardened intervals (8,9) are provided between said segments of said transition regions hardened as aforesaid, and the unhardened running surface of the adjacent bearing pin.

5. A method as defined in claim 1 in which said hardening is performed by inductive heating.

6. A method as defined in claim 1 in which a segment of the periphery of each transition region is hardened in said hardening step which includes at least the portion of said periphery within the longitudinal overlap of bearing pins adjoining the same crank web.

7. A method as defined in claim 6 in which said segment extends over approximately 150° of the transition region.

8. A crankshaft for a reciprocating piston machine comprising:

bearing pins (2,3) joined by crank webs (1) with transitions (4,5) therebetween in the form of rounded grooves having generally a more extensive rounded surface on the crankweb side than on the bearing pin side, and hardened regions extending around at least a portion of the periphery of each of said transitions and extending into the body of said crankwebs on one side of said transitions but reaching short of the boundary of said transition and the adjacent bearing pin on the other side of said transition.

9. A crankshaft as defined in claim 8 in which the hardened segment of each transition (4,5) extends peripherally at least over the longitudinal overlap region of successive bearing pins (2,3).

* * * * *